US006981177B2

(12) United States Patent
Beattie

(10) Patent No.: US 6,981,177 B2
(45) Date of Patent: Dec. 27, 2005

(54) METHOD AND SYSTEM FOR DISASTER RECOVERY

(75) Inventor: Andrew M. H. Beattie, Wiveliscombe (GB)

(73) Assignee: Computer Associates Think, Inc., Islandia, NY (US)

( * ) Notice: Subject to any disclaimer, the term of this patent is extended or adjusted under 35 U.S.C. 154(b) by 111 days.

(21) Appl. No.: 10/397,511

(22) Filed: Mar. 25, 2003

(65) Prior Publication Data

US 2003/0200480 A1 Oct. 23, 2003

Related U.S. Application Data

(60) Provisional application No. 60/373,943, filed on Apr. 19, 2002.

(51) Int. Cl.[7] ............................................. G06F 11/00
(52) U.S. Cl. ......................................... 714/20; 714/16
(58) Field of Search ................................ 714/6, 15, 20, 714/16; 707/202, 204

(56) References Cited

U.S. PATENT DOCUMENTS

| 5,276,860 | A |   | 1/1994 | Fortier et al. ................ 395/575 |
| 5,404,508 | A | * | 4/1995 | Konrad et al. ............... 707/202 |
| 5,446,884 | A | * | 8/1995 | Schwendemann et al. .. 707/202 |
| 5,594,900 | A | * | 1/1997 | Cohn et al. .................. 707/202 |
| 5,668,991 | A | * | 9/1997 | Dunn et al. .................. 707/202 |
| 6,446,075 | B1 |   | 9/2002 | Velasco |
| 6,691,245 | B1 | * | 2/2004 | DeKoning ..................... 714/6 |
| 6,694,447 | B1 | * | 2/2004 | Leach et al. ................... 714/6 |
| 2002/0049764 | A1 |   | 4/2002 | Boothby et al. |
| 2002/0073109 | A1 |   | 6/2002 | Toriumi |
| 2002/0194183 | A1 |   | 12/2002 | Yoakum et al. |
| 2003/0065685 | A1 |   | 4/2003 | Belcaid et al. |
| 2003/0225780 | A1 |   | 12/2003 | Adams et al. |
| 2004/0024795 | A1 |   | 2/2004 | Hind et al. |

FOREIGN PATENT DOCUMENTS

| EP | 1 152 352 A2 | 11/2001 | ........... G06F 17/30 |
| WO | WO 01/01251 A1 | 1/2001 | ........... G06F 11/14 |

OTHER PUBLICATIONS

MS Windows NT Workstation 4.0 Resource Guide, published 195, Chapter 17.*
International Search Report for PCT/US 03/11024, 7 pages, Apr. 8, 2004.

* cited by examiner

*Primary Examiner*—Scott Baderman
*Assistant Examiner*—Joshua Lohn
(74) *Attorney, Agent, or Firm*—Fish & Richardson P.C.

(57) ABSTRACT

A method for disaster recovery includes copying at least a portion of information from a first database to a backup system as backup information. The method also includes storing an incremental change in a second database. The incremental change represents a change to at least a portion of the information in the first database. The method further includes restoring the first database using at least one of the backup information and the incremental change.

35 Claims, 5 Drawing Sheets

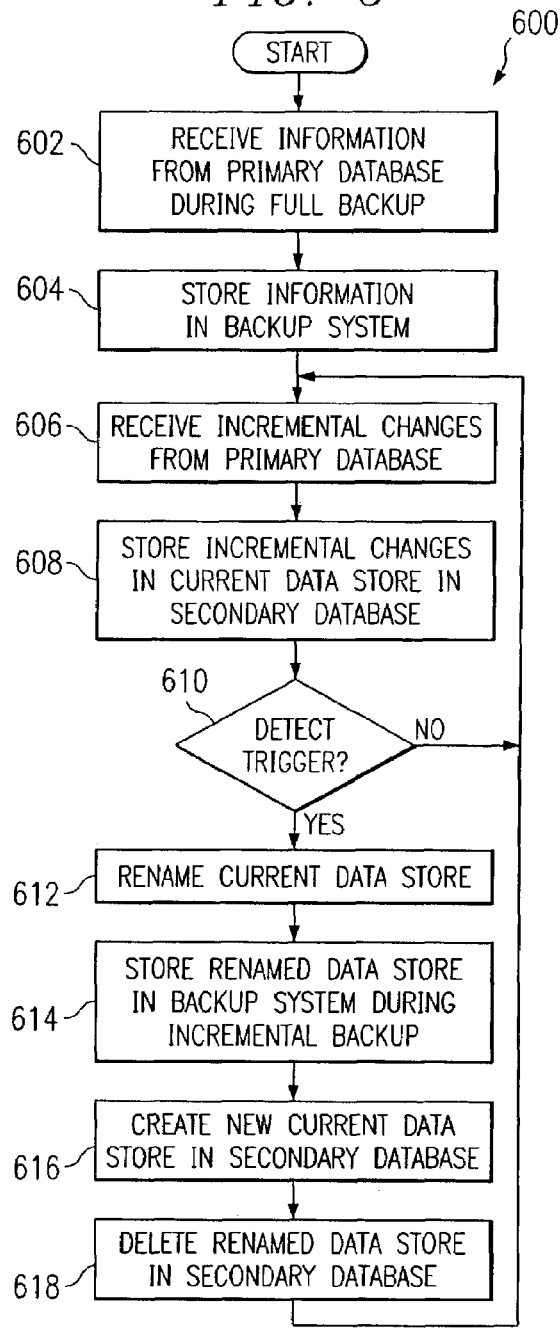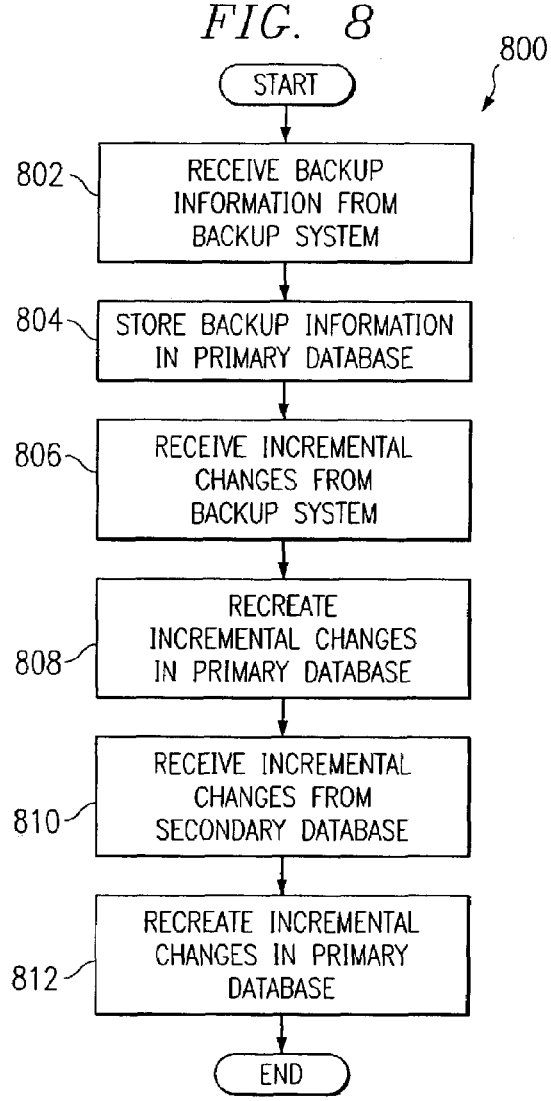

METHOD AND SYSTEM FOR DISASTER RECOVERY

RELATED APPLICATIONS

This application claims priority to co-pending U.S. Provisional Application No. 60/373,943 entitled "System and Method for Disaster Recovery" filed Apr. 19, 2002, which is incorporated herein by reference.

TECHNICAL FIELD

This disclosure relates generally to the field of computing systems, and more particularly to a method and system for disaster recovery.

BACKGROUND

Disaster recovery systems typically backup computer files to protect against data loss. In a typical disaster recovery system, files are periodically copied to a tape or other backup system. This typically occurs during a set time period, such as during off times at night or on weekends. When a computer system fails, the disaster recovery system may use the latest backup to restore the computer system. This typically involves copying the files from the backup system back to the computer system.

A problem with conventional disaster recovery systems is that they may only restore a computer system to the state that existed at the time of the last backup. Any changes to the files that occurred after the last backup are typically lost.

SUMMARY

The present disclosure provides an improved method and system for disaster recovery to substantially reduce or eliminate problems and disadvantages associated with previous systems and methods. In particular, incremental changes to a database are recorded and may be archived as incremental backups, in addition to performing a full backup of the database. The database may then be restored using the full backup, one or more incremental backups, and/or the current unarchived incremental changes.

In one embodiment, a method for disaster recovery includes copying at least a portion of information from a first database to a backup system as backup information. The method also includes storing an incremental change in a second database. The incremental change represents a change to at least a portion of the information in the first database. The method further includes restoring the first database using at least one of the backup information and the incremental change.

In a particular embodiment, the method further includes copying a second incremental change from the second database to the backup system. In this embodiment, restoring the first database includes using at least one of the backup information, the incremental change stored in the second database, and the second incremental change stored in the backup system.

BRIEF DESCRIPTION OF THE DRAWINGS

For a more complete understanding of the present disclosure, reference is now made to the following descriptions, taken in conjunction with the accompanying drawings, in which:

FIG. 6 is an exemplary flow diagram illustrating a method for file backup at a secondary server according to one embodiment of the present disclosure;

FIG. 8 is an exemplary flow diagram illustrating a method for file restoration at a primary server according to one embodiment of the present disclosure

DETAILED DESCRIPTION OF EXAMPLE EMBODIMENTS

Figure 1:
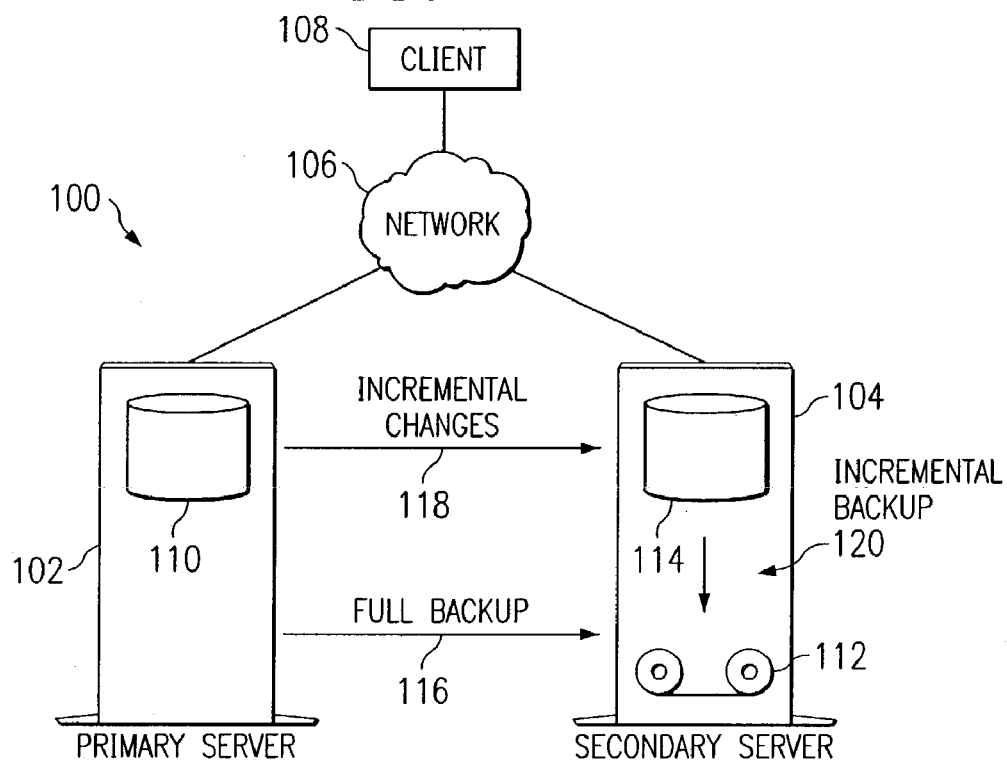
FIG. 1 is an exemplary block diagram illustrating a disaster recovery system according to one embodiment of the present disclosure.

FIG. 1 is an exemplary block diagram illustrating a disaster recovery system 100 according to one embodiment of the present disclosure. In the illustrated embodiment, system 100 includes a primary server 102, a secondary server 104, a network 106, and one or more clients 108. Other embodiments of system 100 may be used without departing from the scope of the present disclosure.

In one aspect of operation, a primary database 110 stores information used by primary server 102. Database 110 may, for example, store information used by primary server 102 to provide on-line web services to clients 108. Database 110 may also store registry information, such as configuration information used by an operating system. The information in database 110 may change over time, such as when information is added, modified, or deleted by a client 108. Database 110 in primary server 102 may also fail or become inoperable, such as when a hardware or power failure occurs.

After primary database 110 becomes operational again, the information in database 110 may need to be restored. As a particular example, database 110 may lose information after it fails, and that information may need to be copied to database 110 before database 110 may reenter service. In one embodiment, at least a portion of the information stored in primary database 110 may routinely be copied to or archived in a backup system 112. As changes are made to the information in database 110, the changes may be stored in a secondary database 114. The changes in secondary database 114 may or may not be routinely archived in backup system 112. Primary database 110 may then be restored using the information in backup system 112 and/or secondary database 114.

Primary server 102 is coupled to network 106. In this document, the term "couple" refers to any direct or indirect communication between two or more components, whether or not those components are in physical contact with one another. Also, the term "communication" may refer to communication between physically separate components or between components within a single physical unit. Primary server 102 is operable to perform one or more of a variety of functions in system 100. Primary server 102 could, for example, represent a web server operable to provide on-line web services to clients 108 over network 106. Primary server 102 could also represent a database server operable to store information used by employees of an organization. Primary server 102 could perform any other and/or additional functions in system 100 without departing from the scope of the present disclosure. Primary server 102 may include any hardware, software, firmware, or combination thereof operable to perform at least one function in system 100. In the illustrated embodiment, primary server 102 includes a database 110 operable to store information used by clients 108. Other embodiments of primary server 102 may be used without departing from the scope of the present disclosure.

Secondary server 104 is coupled to network 106. Secondary server 104 stores information used by system 100 to perform disaster recovery operations. For example, secondary server 104 may store information used to restore database 110 in primary server 102. In this document, the term "restore" refers to returning the information stored in a database to a previous state. The previous state may, for example, have existed at or near the time of a failure of database 110. The previous state may also have existed at a time preceding the failure of database 110. In one embodiment, secondary server 104 may store a full backup of the information in database 110 of primary server 102. Secondary server 104 may also store the changes made to the information in database 110. After database 110 fails and becomes operational again, secondary server 104 may communicate the backup information and the incremental changes to primary server 102, and primary server 102 may use the information to restore database 110. Secondary server 104 may include any hardware, software, firmware, or combination thereof operable to store and facilitate retrieval of information used to restore at least one primary database 110. In the illustrated embodiment, secondary server 104 includes a backup system 112 and a secondary database 114. Other embodiments of secondary server 104 may be used without departing from the scope of the present disclosure.

Network 106 is coupled to primary server 102, secondary server 104, and client 108. Network 106 facilities communication between components of system 100. Network 106 may, for example, communicate Internet Protocol (IP) packets, frame relay frames, Asynchronous Transfer Mode (ATM) cells, and/or any other suitable information in any suitable format between network addresses. Network 106 may include one or more local area networks (LANs), metropolitan area network (MANs), wide area networks (WANs), all or a portion of the global computer network known as the Internet, and/or any other communications system or systems at one or more locations.

Client 108 is coupled to network 106. Client 108 is operable to allow a user to access and/or alter the information contained in database 110 of primary server 102. For example, client 108 may submit a database query to primary server 102 over network 106, such as a request to retrieve specified information from database 110. Client 108 could also submit commands to primary server 102 instructing primary server 102 to add, change, or delete information contained in database 110. Client 108 may include any hardware, software, firmware, or combination thereof operable to communicate and/or receive information over network 106. Client 108 may, for example, include a desktop computer executing a web browser.

Primary database 110 is operable to store information used by primary server 102 to perform one or more functions in system 100. In this document, the term "database" may refer to a collection of information. The information may reside in a document or other file, in a registry, in a collection of files and/or registries, and/or in any other suitable structure or structures. In one embodiment, database 110 may store information used by primary server 102 to provide web services to clients 108 over network 106. As particular examples, database 110 may store the names, addresses, and product orders of customers of a business using primary server 102. Database 110 may store any other and/or additional information without departing from the scope of the present disclosure. Database 110 may include any hardware, software, firmware, or combination thereof operable to store and facilitate retrieval of information. Database 110 may store information using any of a variety of data structures, arrangements, and/or compilations. Database 110 may, for example, include a dynamic random access memory (DRAM), a static random access memory (SRAM), or any other suitable volatile or nonvolatile storage and retrieval device or devices. Although FIG. 1 illustrates primary database 110 residing in primary server 102, primary database 110 could reside at any location or locations accessible by primary server 102.

Backup system 112 is operable to store or archive information from primary database 110 and/or secondary database 114. For example, backup system 112 may receive all or a portion of the information in primary database 110 and store the information. As a particular example, backup system 112 may receive information from primary database 110 during a full backup 116 of database 110. When database 110 fails and becomes operational again, backup system 112 may communicate the backup information to primary server 102, and primary server 102 may use the backup information to restore database 110. In addition, in one embodiment, backup system 112 may store or archive at least a portion of the information stored in secondary database 114. The archival of information from secondary database 114 to backup system 112 may be referred to as an incremental backup 120. Backup system 112 may include any hardware, software, firmware, or combination thereof operable to store and facilitate retrieval of information. In the illustrated embodiment, backup system 112 includes a tape backup system. Other embodiments of backup system 112 may be used without departing from the scope of the present disclosure.

Secondary database 114 is operable to store information identifying the changes made to the information in database 110. In one embodiment, secondary database 114 stores one or more incremental changes 118. An incremental change 118 may describe how the information in primary database 110 has changed since a last full backup 116. In one embodiment, an incremental change 118 corresponds to a database operation, such as an operation that writes data to, deletes data from, or modifies data in primary database 110. In a particular embodiment, an incremental change 118 may identify a segment of primary database 110 that has been changed. As particular examples, if information is added to a table in primary database 110, an incremental change 118 may identify that table, the information added to the table, and where the information is added in the table. If information is deleted from a table in primary database 110, an incremental change 118 may identify that table and what information was deleted from the table. If information is modified in a table in primary database 110, an incremental change 118 may identify that table and the new modified information contained in that table. Other information may be contained in incremental change 118 and/or stored in secondary database 114 without departing from the scope of the present disclosure. Although this specification may describe incremental changes 118 as representing changes to files in primary database 110, incremental changes 118 may represent changes to any information in primary database 110. As a particular example, an incremental change 118 could represent a change made to a registry in primary database 110. Secondary database 114 may include any hardware, software, firmware, or combination thereof operable to store and facilitate retrieval of information. Secondary database 114 may store information using any of a variety of data structures, arrangements, and/or compilations. Although FIG. 1 illustrates secondary database 114 residing in secondary server 104, secondary database 114 could reside at any location or locations accessible by secondary server 104.

In one aspect of operation, system 100 uses secondary server 104 to perform disaster recovery when primary database 110 in primary server 102 fails. In a particular embodiment, the disaster recovery operation involves two general phases, a backup phase and a recovery phase. The backup phase may include copying at least a portion of the information from primary database 110 to secondary server 104 to backup system 112 and/or secondary database 114. The recovery phase may include copying at least a portion of the information from backup system 112 and/or secondary database 114 back to primary database 110, thereby restoring primary database 110 to a previous state.

In one embodiment, the backup phase of the disaster recovery operation involves the performance of a full backup 116 and the storage of incremental changes 118 in secondary server 104. The full backup 116 copies at least a portion of the information from primary database 110 to backup system 112 in secondary server 104. In a particular embodiment, a full backup 116 involves copying all of the information from primary database 110 to backup system 112. In another particular embodiment, a full backup 116 involves copying a subset of the information in primary database 110 to backup system 112. The information involved in the full backup 116 may be specified by a user, such as a user using client 108 or an interface to primary server 102 or secondary server 104, or in any other suitable manner.

In this embodiment, in addition to the full backup 116, changes made to the information in primary database 110 may be recorded as incremental changes 118 in secondary database 114. In one embodiment, the incremental changes 118 are stored in secondary database 114 until the next full backup 116 begins. After the next full backup 116 begins, secondary database 114 may be reinitialized, such as by deleting any incremental changes 118 stored in secondary database 114. In a particular embodiment, the incremental changes 118 stored in secondary database 114 may be divided according to time. For example, the incremental changes 118 may be stored in different files or data stores based on when the incremental changes 118 occurred, and each file or data store may correspond to a different time period. In this document, the term "each" refers to each of at least a subset of the identified items.

In this embodiment, the backup information stored in backup system 112 and the incremental changes 118 stored in secondary database 114 may be used to restore primary database 110 in the event of a database failure. In other words, the previous state of primary database 110 could be recreated using the backup information stored in backup system 112 and the incremental changes 118 stored in secondary database 114. In particular, primary server 102 could copy the backup information from backup system 112 to primary database 110, which restores primary database 110 to the state that existed at or near the time of the last full backup 116. Primary server 102 could leave primary database 110 in this state. Primary server 102 could also receive some or all of the incremental changes 118 from secondary database 114 and recreate those incremental changes 118 in primary database 110. For example, primary server 102 could receive an incremental change 118 representing a deletion of information from a database table, and primary server 102 could implement the change in primary database 110 by deleting the identified information from the database table. In this way, primary server 102 could use the incremental changes 118 stored in secondary database 114 to restore primary database 110 to a state that existed between the time of the last full backup 116 and the time of the database failure. In a particular embodiment, primary server 102 recreates the incremental changes 118 sequentially, starting at the time of the last full backup 116 and proceeding until the time of the database failure is reached or until a desired time is reached. A user may be allowed to specify whether the primary database 110 should be restored to the time of the database failure or to another time.

In another embodiment, secondary server 104 may perform one or more incremental backups 120 during the backup phase of the disaster recovery operation. In this embodiment, the incremental changes 118 stored in secondary database 114 may be copied or archived in backup system 112, and the archived incremental changes 118 may but need not be deleted from secondary database 114. As a particular example, secondary server 104 could archive incremental changes 118 in backup system 112 every fifteen or thirty minutes, although any other suitable time period may be used. In this way, secondary database 114 may store incremental changes 118 for a limited time period. In a particular embodiment, the incremental changes 118 in secondary server 104 may be stored in different files or data stores depending on when the incremental changes 118 occurred, and an incremental backup 120 copies one or more of the files or data stores to backup system 120.

In this embodiment, the full backup information stored in backup system 112, the incremental changes 118 stored in backup system 112 as incremental backups 120, and the incremental changes 118 stored in secondary database 114 may be used to restore primary database 110. In this embodiment, primary server 102 could copy the backup information from backup system 112 to primary database 110, which restores primary database 110 to the state that existed at or near the time of the last full backup 116. Primary server 102 could leave primary database 110 in this state. Primary server 102 could also receive some or all of the incremental backups 120 from backup system 112 and recreate the incremental changes 118 contained in those incremental backups 120. This restores primary database 110 to the state that existed at or near the time of the last incremental backup 120 received and implemented. Again, primary server 102 could leave primary database 110 in this state, or primary server 102 could receive and implement the incremental changes 118 stored in secondary database 114. In a particular embodiment, primary server 102 recreates the incremental changes 118 in both backup system 112 and secondary database 114 sequentially. Also, a user may be given the option of specifying the time to which primary database 110 will be restored.

The previous description describes various ways in which information may be stored in secondary server 104 during the backup phase of the disaster recovery operation. It also describes various ways in which primary database 110 may be restored during the recovery phase of the disaster recovery operation using the information in secondary server 104. Any other and/or additional methods and techniques may be used to store information in secondary server 104 during the backup phase and/or restore primary database 110 during the recovery phase without departing from the scope of the present disclosure. For example, system 100 could be programmed to always restore primary database 110 to the state that existed at or near the time of the failure of database 110. In this embodiment, a user may not be given the option of restoring primary database 110 to a state that existed before the failure of database 110.

Although FIG. 1 illustrates one example embodiment of a disaster recovery system 100, various changes may be made to system 100 without departing from the scope of the present disclosure. For example, while FIG. 1 illustrates one primary server 102 and one secondary server 104, system 100 may include any suitable number of primary servers 102 and/or secondary servers 104. As a particular example, system 100 could include multiple primary servers 102, such as between one and eight primary servers 102, for each secondary server 104. Also, while FIG. 1 illustrates secondary server 104 as including backup system 112 and secondary database 114, backup system 112 and database 114 could reside on separate platforms. In addition, while FIG. 1 illustrates the use of servers 102 and 104, any other suitable computing or communicating device or devices may be used in system 100.

Figure 2A:
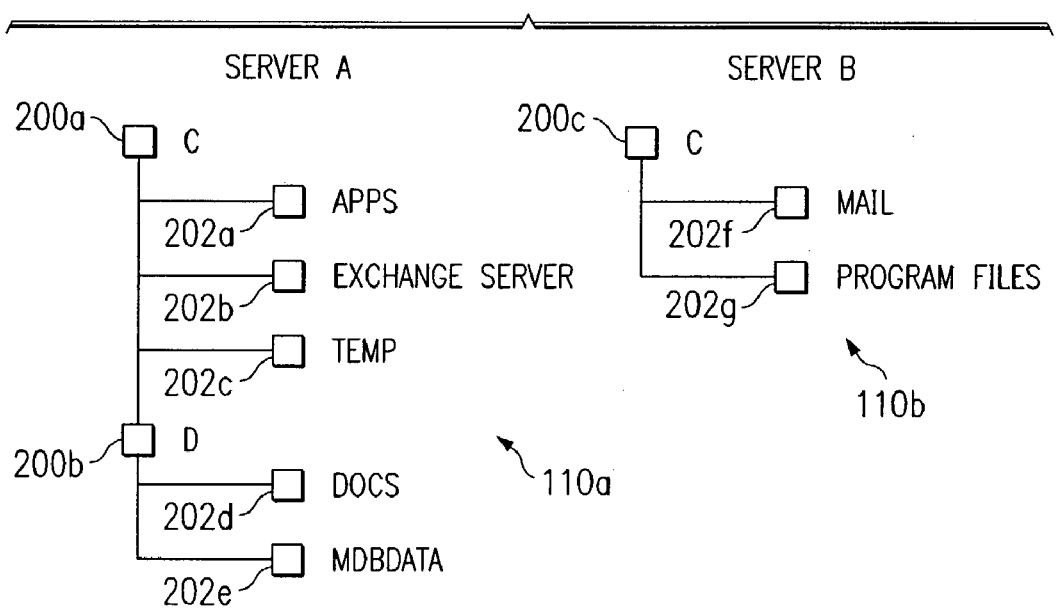
FIGS. 2A and 2B are exemplary block diagrams illustrating primary and secondary databases according to one embodiment of the present disclosure.
Figure 2B:
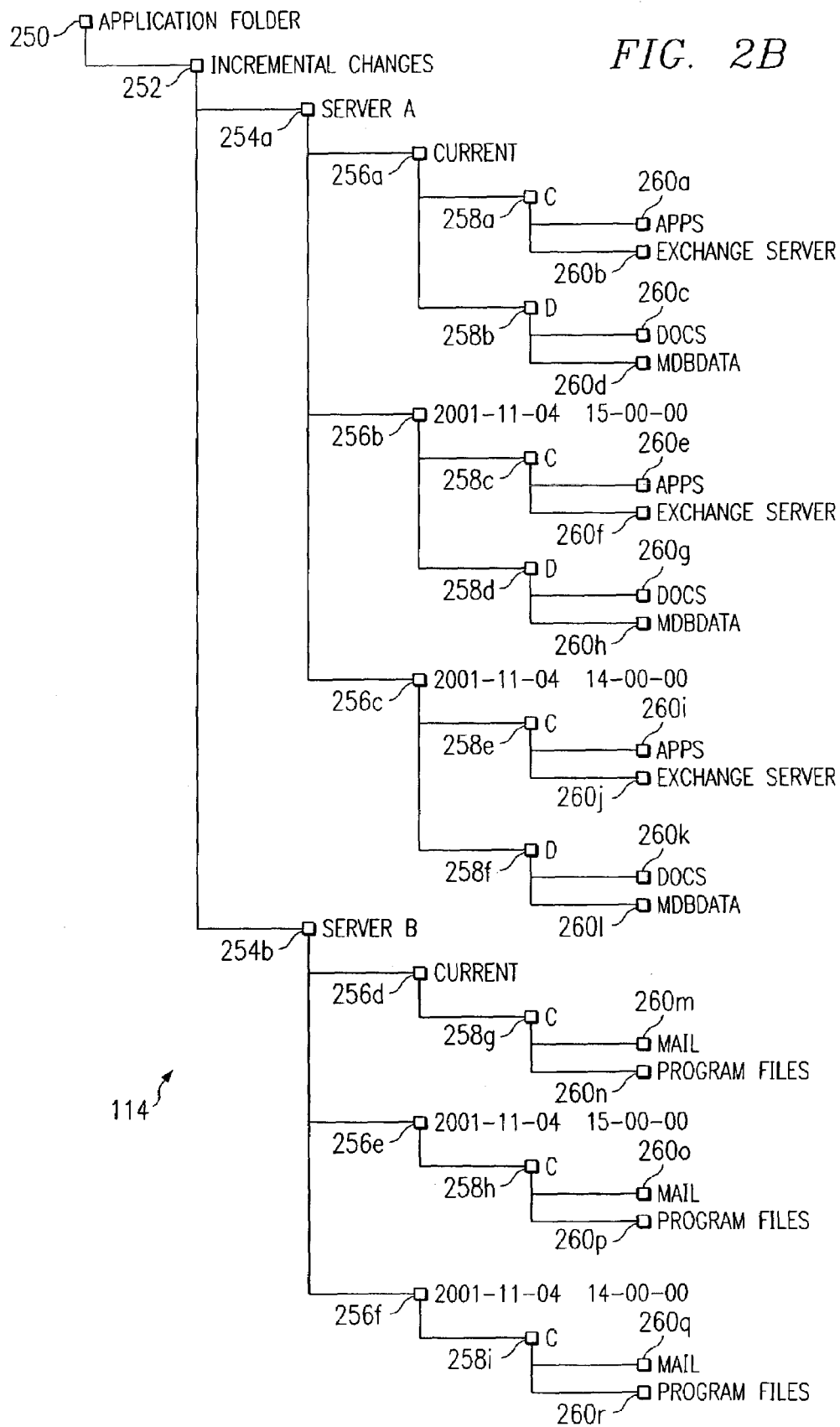

FIGS. 2A and 2B are exemplary block diagrams illustrating primary and secondary databases 110 and 114 according to one embodiment of the present disclosure. In particular, FIG. 2A illustrates two example primary databases 110 in two primary servers 102, and FIG. 2B illustrates an example secondary database 114 in secondary server 104. The database contents shown in FIGS. 2A and 2B are for illustration only. Databases 110 and 114 may include any other and/or additional information in any suitable arrangement without departing from the scope of the present disclosure.

In FIG. 2A, the contents of two primary databases 110a and 110b are subdivided using a standard folder system. In a folder system, contents may be divided into a hierarchy of folders. Each folder may contain information, applications, additional folders, files, registries, no contents, and/or any other contents. Although this specification may describe incremental changes 118 being made to files in folders 200 and 202, incremental changes 118 may affect any other contents of folders 200 and 202 without departing from the scope of the present disclosure.

In the illustrated embodiment, the contents of database 110a are divided into two drive folders 200a and 200b, while the contents of database 110b reside in a single drive folder 200c. In one embodiment, a database 110 may include multiple physical drives and/or logical drives. In the illustrated embodiment, database 110a has two physical and/or logical drives represented by drive folders 200a and 200b, and database 110b has one physical and/or logical drive represented by drive folder 200c.

Within each drive folder 200, the contents of a database 110 may be further subdivided into file system folders 202. The file system folders 202 could, for example, represent different categories of information in a database 110. In the illustrated embodiment, drive folder 200a is divided into three file system folders 202a–202c. Folder 202a may contain applications that can be executed by primary server 110a. Folder 202b may contain instructions and information that allow users to communicate and share information using an exchange server application. Folder 202c may contain information to be stored temporarily. The contents of file system folders 202 could include specific files used by applications executed by a primary server 102, additional folders, database tables, and/or any other information. Folders 200–202 may be further subdivided using additional layers of folders without departing from the scope of the present disclosure.

In one aspect of the disaster recovery operation, at least a portion of the information in a primary database 110 may be copied to backup system 112 during a full backup 116 and monitored for incremental changes 118. In one embodiment, all of the information in a primary database 110 is copied to backup system 112 and monitored for incremental changes 118. In another embodiment, a subset of the information in a primary database 110 is copied to backup system 112 and monitored for incremental changes 118. In a particular embodiment, a user may specify which folders 200–202 and/or files in primary database 110 are to be copied to backup system 112 and/or monitored for incremental changes 118. This may be useful, for example, when some information in primary database 110 does not change over time.

In another aspect of the disaster recovery operation, incremental changes 118 to the information in a primary database 110 may be stored in secondary database 114 of secondary server 104. For example, information may be added, changed, or deleted in primary databases 110a and 110b, and these changes may be recorded in secondary database 114.

FIG. 2B illustrates one example of secondary database 114. In the illustrated embodiment, secondary database 114 uses a standard folder system to store incremental changes 118. In the illustrated embodiment, secondary database 114 includes an application folder 250, an incremental changes folder 252, one or more server folders 254, one or more timestamp folders 256, one or more drive folders 258, and one or more file system folders 260. In this embodiment, secondary server 104 may store incremental changes 118 in files located in drive folders 258 and/or file system folders 260. Other embodiments and/or arrangements may be used without departing from the scope of the present disclosure.

Application folder 250 may represent the folder in which information associated with a disaster recovery application is stored in secondary database 114. As a particular example, the application folder 250 may include the incremental changes 118 made to one or more primary databases 110, the application files used to restore primary databases 110, and/or any other suitable information.

Incremental changes folder 252 may store the incremental changes 118 made to one or more primary databases 110. Incremental changes folder 252 may, for example, help to keep the incremental changes 118 separate from other information stored in the application folder 250.

Each server folder 254 may store the incremental changes 118 made by a specific primary server 102. In the illustrated embodiment, secondary database 114 includes two server folders 254a and 254b, one for a first primary server 102 having primary database 110a and one for a second primary server 102 having primary database 110b. This may allow, for example, a single secondary database 114 to separate and store incremental changes 118 for multiple primary servers 102. Any suitable number of primary servers 102 may be served by secondary database 114. In one embodiment, secondary database 114 may serve between one and eight primary servers 102.

Timestamp folders 256 represent different time periods during which an incremental change 118 may be made. In the illustrated embodiment, each server folder 254 includes at least two timestamp folders 256. One timestamp folder 256 labeled "CURRENT" stores the incremental changes 118 from a current time period, and at least one other timestamp folder 256 stores the incremental changes 118 from a previous time period. Other embodiments using any number of timestamp folders 256 may be used without departing from the scope of the present disclosure. For example, secondary database 114 could include a timestamp folder 256 for each time period that has elapsed since the last full backup 116.

In the illustrated embodiment, timestamp folders 256 representing time periods other than the current time period include a timestamp label. In this document, the term "timestamp" refers to any information or structure operable to at least partially identify or represent a date and/or a time. In a particular embodiment, each of these timestamp folders 256 may include a timestamp identifying when secondary server 104 started or stopped storing incremental changes 118 in that timestamp folder 256. For example, in one embodiment, timestamp folders 256 may store incremental changes 118 that occurred during different hours of the day, and each timestamp may identify a particular hour of the day. Other labels may be given to timestamp folders 256 with or without reference to a date and/or a time without departing from the scope of the present disclosure.

Each drive folder 258 in secondary database 114 may correspond to a drive folder 200 in a primary database 110. Each file system folder 260 in secondary database 114 may correspond to a file system folder 202 in a primary database 110.

In one aspect of operation, incremental changes 118 are stored within files located in drive folders 258, file system folders 260, and/or other folders in secondary database 114. In a particular embodiment, the files in secondary database 114 are sparse files. In the following description, the collection of files located in a timestamp folder 256 may be referred to as a data store.

When a change is made to information in a primary database 110, the change may be communicated to secondary server 104 as an incremental change 118. Secondary server 104 may identify the primary server 102 associated with the incremental change 118. Secondary server 104 may also identify where the incremental change 118 was made in that primary server 102. For example, if the incremental change 118 affected a file in a drive folder 200 of primary database 110, secondary server 104 may identify that drive folder 200. If the incremental change 118 affected a file in a file system folder 202 of primary database 110, secondary server 104 may identify that file system folder 202 and the drive folder 200 associated with that file system folder 202. Secondary server 104 may further identify the file in primary database 110 affected by the incremental change 118.

Secondary server 104 may use this and/or other information to access the appropriate folders in secondary database 114. For example, secondary server 104 may access the server folder 254 associated with the identified primary server 102. Secondary server 104 may also access the current timestamp folder 256 contained in that server folder 254. Secondary server 104 may further access the drive folder 258 associated with the identified drive folder 200 and/or the file system folder 260 associated with the identified file system folder 202. After accessing the appropriate folder in secondary database 114, secondary server 104 may store the incremental change 118 in that folder. For example, secondary server 104 may store the incremental change 118 in a file in secondary database 114 that is associated with the identified file. In one embodiment, secondary server 104 may store an incremental change 118 in a file that has the same name as the file in primary database 110 affected by that incremental change 118. As a particular example, if the incremental change 118 affects a file named "pub1.edb" in primary database 110, secondary server 104 may store the incremental change 118 in a file named "pub1.edb" in secondary database 114. In this way, secondary server 104 may recreate at least a portion of the folder hierarchy of a primary database 110 in secondary database 114.

In a particular embodiment, secondary server 104 may continue to store incremental change 118 in the "CURRENT" timestamp folders 256 of secondary database 114 until a given time period elapses. After the time period elapses, secondary server 104 closes and renames the "CURRENT" timestamp folders 256. For example, secondary server 104 may label the timestamp folders 256 using a date and an hour of the day. Secondary server 104 may also create new "CURRENT" timestamp folders 256 and begin storing more incremental changes 118 in the new timestamp folders 256. While the incremental changes 118 are being stored in the new timestamp folders 256, secondary database 114 may communicate the incremental changes 118 in the renamed timestamp folders 256 to backup system 112 as an incremental backup 120. After the incremental backup 120 completes, secondary database 114 may delete the renamed timestamp folders 256. Secondary server 104 may then repeat the process after the next time period elapses by renaming the "CURRENT" timestamp folders 256 and creating new timestamp folders 256. In another embodiment, secondary server 104 may wait until multiple time periods elapse before performing an incremental backup 120.

Secondary server 104 has been described as entering the appropriate timestamp folder 256, drive folder 258, and/or file system folder 260 to store an incremental change 118. This assumes that folders 256–260 exist and can be accessed by secondary server 104. In a particular embodiment, at the start of a full backup 116 for a primary database 110, the incremental changes 118 associated with that primary database 110 may be deleted from secondary database 114. This may occur, for example, by deleting the contents of the appropriate server folder 254. As a result, secondary server 104 may need to create a timestamp folder 256, a drive folder 258, and/or a file system folder 260 before storing an incremental change 118. Also, secondary server 104 may need to create a file in which to store the incremental change 118 in secondary database 114. In this embodiment, when secondary server 104 receives an incremental change 118, secondary server 104 may determine whether the appropriate folders 256–260 and file exist in secondary database 114. If not, secondary server 104 may create the needed folders 256–260 and/or the needed file.

In one embodiment, if an incremental change 118 is not made to the contents of a drive folder 200 or a file system folder 202 of primary database 110, secondary database 114 may lack a corresponding drive folder 258 or file system folder 260. For example, in the illustrated embodiment, drive folder 258e includes file system folders 260i–260j named "APPS" and "EXCHANGE SERVER." These file system folders 260i–260j correspond to file system folders 202a–202b of FIG. 2A. This indicates that incremental changes 118 were made to the contents of file system folders 202a–202b. However, in another embodiment, drive folder 258e could lack file system folder 260i. This might indicate that no incremental changes 118 were made to the contents of the "APPS" file system folders 202a during the time period represented by timestamp folder 256c.

The incremental changes 118 monitored by system 100 and stored in secondary database 114 may vary depending on particular needs. In one embodiment, some database operations involving a primary database 110 need not lead to the creation and storage of incremental changes 118 in secondary database 114. As particular examples, a user may open, close, or read information from a file in primary database 110. These operations do not alter the data in the database file, so no incremental changes 118 need to be stored in secondary database 114.

Other database operations may lead to the creation and storage of incremental changes 118 in secondary database 114. For example, a user may write data to a file in primary database 110. When that occurs, secondary server 104 may determine whether a file with the same name appears in the appropriate folder 258 or 260 of secondary database 114, create the file if it does not exist, and store the newly-written data in that file as an incremental change 118. The user may also delete a file in primary database 110. In this instance, secondary server 104 may mark the corresponding file in secondary database 114 as deleted. Similarly, the user may delete a subtree in primary database 110, which deletes the contents of a folder 200 or 202 in primary database 110. When that occurs, secondary server 104 may delete the contents of the corresponding folder 258 or 260 in secondary database 114 and mark the corresponding folder 258 or 260 as deleted. The user may further rename a file in primary database 110. In that case, secondary server 104 may rename the corresponding file in secondary database 114 from the old name to the new name, create a new file in secondary database 114 having the old name, and mark the new file as deleted. In addition, the user may execute various other commands affecting one or more characteristics of the files in primary database 110. For example, the user may execute commands such as SetBasicInfo and SetCompression, which alter the information and/or compression associated with a file in primary database 110. The user may also execute commands such as SetSecurity and SetSecurityByName, which alter the security characteristics of a file in primary database 110. The user may further truncate a file in primary database 110, which may reduce the size of the file. For these operations, secondary server 104 may store the new file information, file security information, and file length in the corresponding file in secondary database 114. Beyond that, changes made to a registry in primary database 110, such as when an operating system adds, updates, or removes configuration information in the registry, may be stored in secondary database 114. Other incremental changes 118 may be stored in secondary database 114 without departing from the scope of the present disclosure.

Although FIGS. 2A and 2B illustrate example primary and secondary databases 110 and 114, various changes may be made to databases 110 and 114 without departing from the scope of the present disclosure. For example, folders 200–202 and folders 250–260 are for illustration only. Any other and/or additional folders may be used in databases 110 and/or 114. Also, any suitable arrangement of information may be used in place of a folder system.

Figure 3:
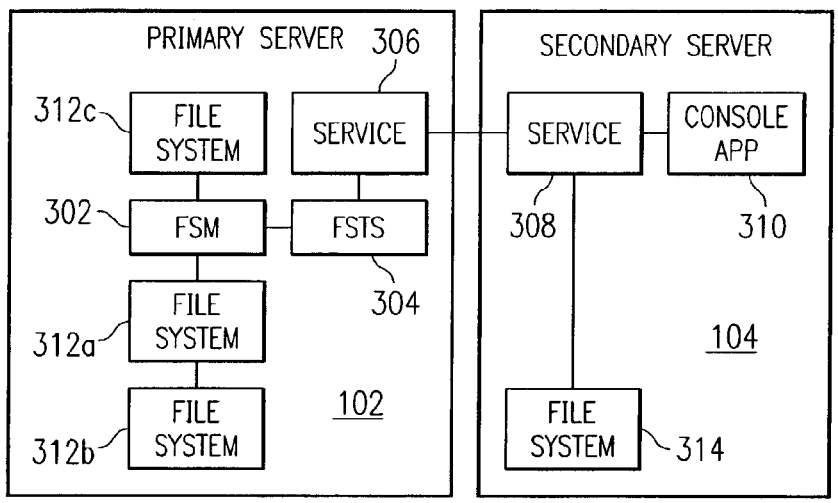
FIG. 3 is an exemplary block diagram illustrating a portion of a disaster recovery architecture according to one embodiment of the present disclosure.

FIG. 3 is an exemplary block diagram illustrating a portion of a disaster recovery architecture 300 according to one embodiment of the present disclosure. Architecture 300 may, for example, represent software routines executed on primary server 102 and secondary server 104. In the illustrated embodiment, architecture 300 includes a file system monitor (FSM) 302, a file system transaction server (FSTS) 304, a primary service 306, a secondary service 308, and a console application 310. Other embodiments of architecture 300 may be used without departing from the scope of the present disclosure.

File system monitor 302 is operable to monitor and detect incremental changes 118 to files in one or more file systems 312a–312c (referred to collectively as file systems 312). A file system 312 may, for example, support the database architecture shown in FIG. 2A. In a particular embodiment, file system monitor 302 may detect write, create, rename, and delete operations that are performed on files or registries in file systems 312. When file system monitor 302 detects an incremental change 118, file system monitor 302 may inform file system transaction server 304. For example, if file system monitor 302 detects an addition of a block of data to a file, file system monitor 302 may inform file system transaction server 304 of the name of the affected file, the address where the block of data was written to, and the size of the data block. File system monitor 302 may include any hardware, software, firmware, or combination thereof operable to detect incremental changes 118 in one or more file systems 312. File system monitor 302 may, for example, include a kernel-mode software driver executed by one or more processors in primary server 102.

File system transaction server 304 is operable to receive the incremental changes 118 identified by file system monitor 302 and accumulate incremental changes 118 for a given time period. For example, file system transaction server 304 may accumulate incremental changes 118 during five-second windows. File system transaction server 304 may include any hardware, software, firmware, or combination thereof operable to receive and accumulate incremental changes 118. File system transaction server 304 may, for example, include a kernel-mode software driver executed by one or more processors in primary server 102. In a particular embodiment, file system transaction server 304 acts as a client process of file system monitor 302. In another embodiment, accumulation of incremental changes 118 may not be performed, and file system transaction server 304 may be omitted from architecture 300.

Primary service 306 and secondary service 308 are operable to facilitate communication between primary server 102 and secondary server 104. For example, primary service 306 may receive accumulated incremental changes 118 from file system transaction server 304 and communicate the incremental changes 118 to secondary service 308. Secondary service 308 may receive the incremental changes 118 from primary service 306 and write the incremental changes 118 to a file system 314. File system 314 may, for example, support the database architecture shown in FIG. 2B. Primary service 306 and secondary service 308 may include any hardware, software, firmware, or combination thereof operable to facilitate communication between primary server 102 and secondary server 104. Primary service 306 and secondary service 308 may, for example, include user-mode applications executed by one or more processors in primary server 102 and secondary server 104, respectively.

Console application 310 is operable to provide an interface to control the disaster recovery operation in system 100. Console application 310 may, for example, allow a user to control the disaster recovery operation using script files. As particular examples, a user may rename or delete a data store in secondary database 114 through the use of appropriate script commands. A user could also cause system 100 to restore primary database 110 using an appropriate script command. Other methods of controlling the disaster recovery operation, such as through the use of Application Programming Interfaces (APIs), may be used without departing from the scope of the present disclosure.

In one embodiment, primary service 306 and/or secondary service 308 support the execution of one or more tasks. A task may represent a process run by primary service 306 and/or secondary service 308 that implement some or all of the disaster recovery functionality. For example, one or more replication tasks may be responsible for replicating incremental changes 118 made to primary database 110 in secondary database 114. In a particular embodiment, a user may start, stop, and control the replication task, such as through the use of appropriate script commands entered through console application 310.

In this embodiment, a taskfile may be used by the replication task to replicate incremental changes 118 in secondary database 114. The taskfile may, for example, identify the files, folders 200–202, registries, and/or registry branches in primary database 110 that are to be monitored for incremental changes 118. The taskfile may also identify the files, folders 200–202, registries, and/or registry branches in primary database 110 that are to be excluded and not monitored for incremental changes 118. The taskfile may further identify timeout parameters and other parameters used in the disaster recovery operation. The taskfile may, for example, represent an .INI file that can be edited manually and/or programmatically using standard APIs.

In one aspect of operation, a user may activate the replication task for a particular primary server 102. In a particular embodiment, the replication task may be activated before a full backup 116 begins, thus helping to ensure that any incremental changes 118 made by that primary server 102 during the full backup 116 are captured in system 100. The primary service 306 may read the taskfile and identify which files, folders 200–202, registries, and/or registry branches need to be monitored. Primary service 306 may also configure the file system transaction server 304 to monitor those files, folders 200–202, registries, and/or registry branches. File system transaction server 304 may then monitor any incremental changes 118 detected by file system monitor 302, report incremental changes 118 made to the monitored files, folders 200–202, registries, and/or registry branches, and ignore incremental changes 118 made to the excluded files, folders 200–202, registries, and/or registry branches. Secondary service 308 may initialize the secondary database 114 for storage of incremental changes 118. For example, secondary service 308 may create a "CURRENT" timestamp folder 256 under the appropriate server folder 254. Primary service 306 and secondary service 308 may also establish a communication link, such as a link over network 106.

The user may also deactivate the replication task. When that occurs, primary service 306 and secondary service 308 may stop communicating incremental changes 118. The user may proceed to delete the current data store, which may delete the current timestamp folder 256 in secondary database 114. The user could also rename the current data store, such as by renaming the current timestamp folder 256 in secondary database 114 to reflect a date and time. After renaming the current data store, the user may then restart the replication task. This causes system 100 to again monitor and record incremental changes 118 in a new current data store, such as a new timestamp folder 256.

FIG. 3 has been described as allowing a user to use console application 310 to control the disaster recovery operations in system 100. System 100 could also be configured to automatically start and stop the replication task, rename a data store, and/or delete a data store as needed.

Although FIG. 3 illustrates an example of a portion of a disaster recovery architecture 300, various changes may be made to architecture 300 without departing from the scope of the present disclosure. For example, the functional divisions in FIG. 3 are for illustration only. Various functional components could be combined with one another or removed, depending on particular needs, without departing from the scope of the present disclosure. Also, the functions of the components 302–310 of architecture 300 may be implemented using any hardware, software, firmware, or combination thereof. This may include, for example, logic stored in any suitable device, such as a random access memory, a read-only memory, an application-specific integrated circuit (ASIC), or a field programmable gate array (FPGA).

Figure 4:
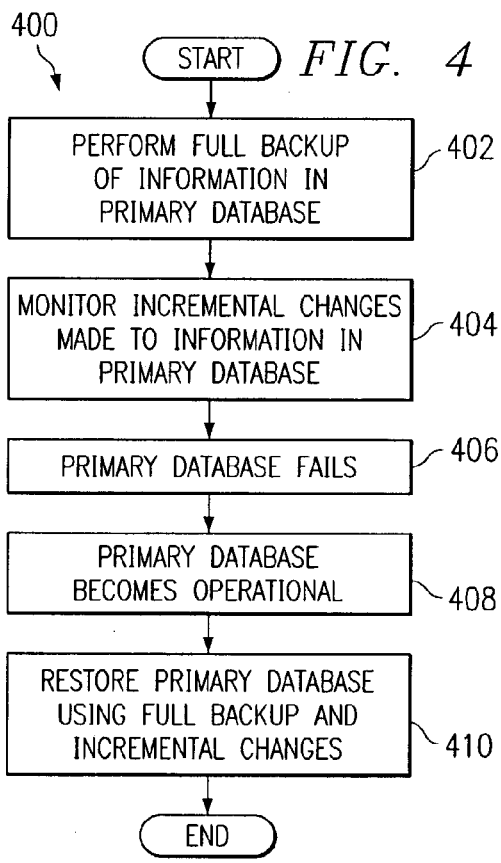
FIG. 4 is an exemplary flow diagram illustrating a method for disaster recovery according to one embodiment of the present disclosure.

FIG. 4 is an exemplary flow diagram illustrating a method 400 for disaster recovery according to one embodiment of the present disclosure. Although method 400 may be described with respect to system 100 of FIG. 1, method 400 may be used by any other suitable system without departing from the scope of the present disclosure.

System 100 performs a full backup 116 of information in a primary database 110 at step 402. This may include, for example, primary server 102 communicating some or all of the information in the primary database 110 to backup system 112. Backup system 112 may reside on secondary server 102 and/or another suitable platform.

System 100 monitors incremental changes 118 made to the information in the primary database 110 at step 404. This may include, for example, primary server 102 identifying the incremental changes 118 made to the information in the primary database 110 and communicating the incremental changes 118 to secondary server 104. This may also include secondary server 104 storing the incremental changes 118 in secondary database 114. This may further include secondary server 104 performing one or more incremental backups 120 in which secondary server 104 stores at least some of the incremental changes 118 from secondary database 114 in backup system 112.

Primary database 110 fails at step 406. This may include, for example, primary database 110 suffering a hardware or software error that renders primary database 110 inoperable. This may also include primary server 102 suffering a power failure. Other causes of the database failure at step 406 may occur without departing from the scope of the present disclosure. Primary database 110 becomes operational again at step 408. This may include, for example, a technician resolving the hardware or software error, the restoration of power to primary server 102, and/or any other suitable corrective action that resolves the database failure.

System 100 restores primary database 110 at step 410. This may include, for example, backup system 112 communicating the information from the last full backup 116 to primary server 102. This may also include backup system 112 communicating incremental changes 118 from one or more incremental backups 120 to primary server 102. This may further include secondary database 114 communicating at least one incremental change 118 to primary server 102. In addition, this may include primary server 102 using the information from secondary server 104 to restore primary database 110. Primary server 102 may restore primary database 110 to a state that existed at or near the time of the database failure, a state that existed before the failure of database 110, and/or to any other suitable state.

Although FIG. 4 illustrates one example of a method 400 for disaster recovery, various changes may be made to method 400 without departing from the scope of the present disclosure. For example, system 100 could restore primary database 110 using information from the last full backup 116 without using incremental changes 118. This may occur, for example, when system 100 is restoring primary database 110 to a state that existed at the time of the last full backup 116. Other changes may be made to method 400 without departing from the scope of the present disclosure.

Figure 5:
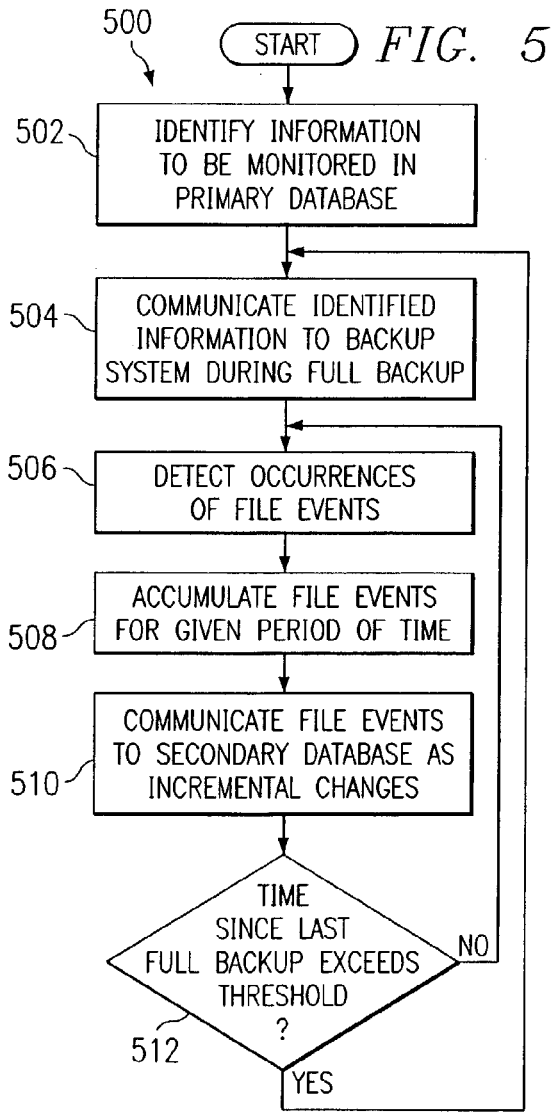
FIG. 5 is an exemplary flow diagram illustrating a method for file backup at a primary server according to one embodiment of the present disclosure.

FIG. 5 is an exemplary flow diagram illustrating a method 500 for file backup at primary server 102 according to one embodiment of the present disclosure. Method 500 may, for example, be used by primary server 102 during the backup phase of the disaster recovery operation. Although method 500 may be described with respect to primary server 102 of FIG. 1, method 500 may be used by any other suitable platform or platforms without departing from the scope of the present disclosure.

Primary server 102 identifies information to be monitored in primary database 110 at step 502. This may include, for example, activation of the replication task executed by primary service 306 and/or secondary service 308. This may also include the replication task accessing a taskfile that identifies one or more files, folders 200–202, registries, and/or registry branches in primary database 110. The files, folders 200–202, registries, and/or registry branches in the taskfile may, for example, be identified by a user of system 100.

Primary server 102 communicates the identified information to backup system 112 during a full backup 116 at step 504. This may include, for example, primary server 102 communicating any identified files to backup system 112. This may also include primary server 102 communicating the contents of any selected folders 200–202 to backup system 112.

Primary server 102 detects the occurrence of one or more file events at step 506. A file event may, for example, represent an addition of new information to an existing or new file in database 110, a modification of existing information in database 110, or a deletion of existing information from database 110. The file events could occur before, during, and/or after the full backup 116 performed at step 104. In one embodiment, file events may be detected by file system monitor 302.

Primary server 102 accumulates file events for a given period of time at step 508. This may include, for example, file system transaction server 304 receiving multiple file events from file system monitor 302 in a given period of time, such as during a five-second window. This may also include file system transaction server 304 combining the file events received during the five-second window into one or a series of messages.

Primary server 102 communicates the file events to secondary database 114 as incremental changes 118 at step 510. This may include, for example, file system transaction server 304 communicating the message or series of messages to primary service 306 and primary service 306 communicating the messages to secondary service 308.

Primary server 102 determines whether the time since the last full backup 116 exceeds a threshold at step 512. This may include, for example, primary server 102 determining whether the time since the last full backup 116 exceeds a threshold time period established by a user. If the time since the last full backup 116 does not exceed the threshold, primary server 102 returns to step 506 to detect the occurrence of additional file events. Otherwise, primary server 102 returns to step 504 to perform another full backup 116. In particular embodiments, primary server 102 may perform a full backup 116 once a day or once a week.

Although FIG. 5 illustrates one example of a method 500 for file backup at a primary server 102, various changes may be made to method 500 without departing from the scope of the present disclosure. For example, primary server 102 could monitor all of the information in primary database 102. In this embodiment, primary server 102 may not need to identify information to be monitored at step 502. Also, primary server 102 could communicate file events to secondary server 104 without accumulating the file events at step 508. In addition, primary server 102 could use any suitable method for determining when to perform a full backup 116, and is not limited to determining whether a time since the last full backup 116 exceeds a threshold time.

FIG. 6 is an exemplary flow diagram illustrating a method 600 for file backup at secondary server 104 according to one embodiment of the present disclosure. Method 600 may, for example, be used by secondary server 104 during the backup phase of the disaster recovery operation. Although method 600 may be described with respect to secondary server 104 of FIG. 1, method 600 may be used by any other suitable platform or platforms without departing from the scope of the present disclosure. Also, although method 600 may be described with respect to a single primary server 102, multiple primary servers 102 may be supported by secondary server 104.

Secondary server 104 receives backup information from a primary database 110 during a full backup 116 at step 602. This may include, for example, secondary server 104 receiving the information from primary server 102 over network 106. Secondary server 104 stores the backup information in backup system 112 at step 604. This may include, for example, backup system 112 recording the backup information from primary database 110 onto one or more computer-readable media, such as magnetic tape or compact disc. This may also include secondary server 104 initializing secondary database 114, such as by deleting any contents of the server folder 254 associated with the primary server 102.

Secondary server 104 receives incremental changes 118 from primary database 110 at step 606. This may include, for example, secondary service 308 receiving one or more messages containing the incremental changes 118 from primary service 306. The incremental changes 118 may be received before, during, and/or after the storage of the backup information in backup system 112 at step 604. Secondary server 104 stores the incremental changes 118 in a current data store at step 608. This may include, for example, secondary service 308 storing the incremental changes 118 in one or more files contained within a "CURRENT" timestamp folder 256 in secondary database 114. This may also include secondary service 308 creating one or more folders 256–260 and/or one or more files in which to store the incremental changes 118 in secondary database 114.

Secondary server 104 determines whether a trigger event occurs at step 610. The trigger event may, for example, represent the passing of a given time period or receipt of a command from a user. If a trigger event is not detected, secondary server 104 returns to step 606 to receive and store additional incremental changes 118. If secondary server 104 detects a trigger event, secondary server 104 proceeds to perform an incremental backup 120. Secondary server 104 closes and renames the current data store at step 612. This may include, for example, secondary server 104 renaming the current timestamp folder 256 in secondary database 114 to include a label reflecting a date and a time. Secondary server 104 stores the renamed data store in backup system 112 during an incremental backup 120 at step 614. This may include, for example, secondary database 112 communicating the information in the renamed timestamp folder 256 to backup system 112. Secondary server 104 creates a new current data store in secondary database 114 at step 616. This may include, for example, secondary server 104 creating a new timestamp folder 256 in secondary database 114 having the name "CURRENT." Secondary server 104 may create the new data store before, during, and/or after the incremental backup 120 that occurs at step 614. Secondary server 104 deletes the renamed data store from secondary database 114 at step 618. This may include, for example, secondary server 104 deleting the renamed timestamp folder 256, and all of the contents of that timestamp folder 256, from database 114. Secondary server 104 returns to step 606 to receive and store additional incremental changes 118 in the new data store.

Although FIG. 6 illustrates one example of a method 600 for file backup at a secondary server 104, various changes may be made to method 600 without departing from the scope of the present disclosure. For example, in another embodiment, secondary server 104 does not perform incremental backups 120. Also, while method 600 illustrates secondary server 104 copying a single data store to backup system 112 during each incremental backup 120, secondary server 104 could copy more data stores to backup system 112 during an incremental backup. In this embodiment, method 600 could be modified to create a new data store after a first trigger event and perform an incremental backup 120 after a second trigger event. Further, method 600 assumes that backup system 112 and secondary database 114 are located on the same platform, such as secondary server 104. In another embodiment, backup system 112 and secondary database 114 may be located on different platforms, and each platform may perform a subset of the illustrated steps.

Figure 7:
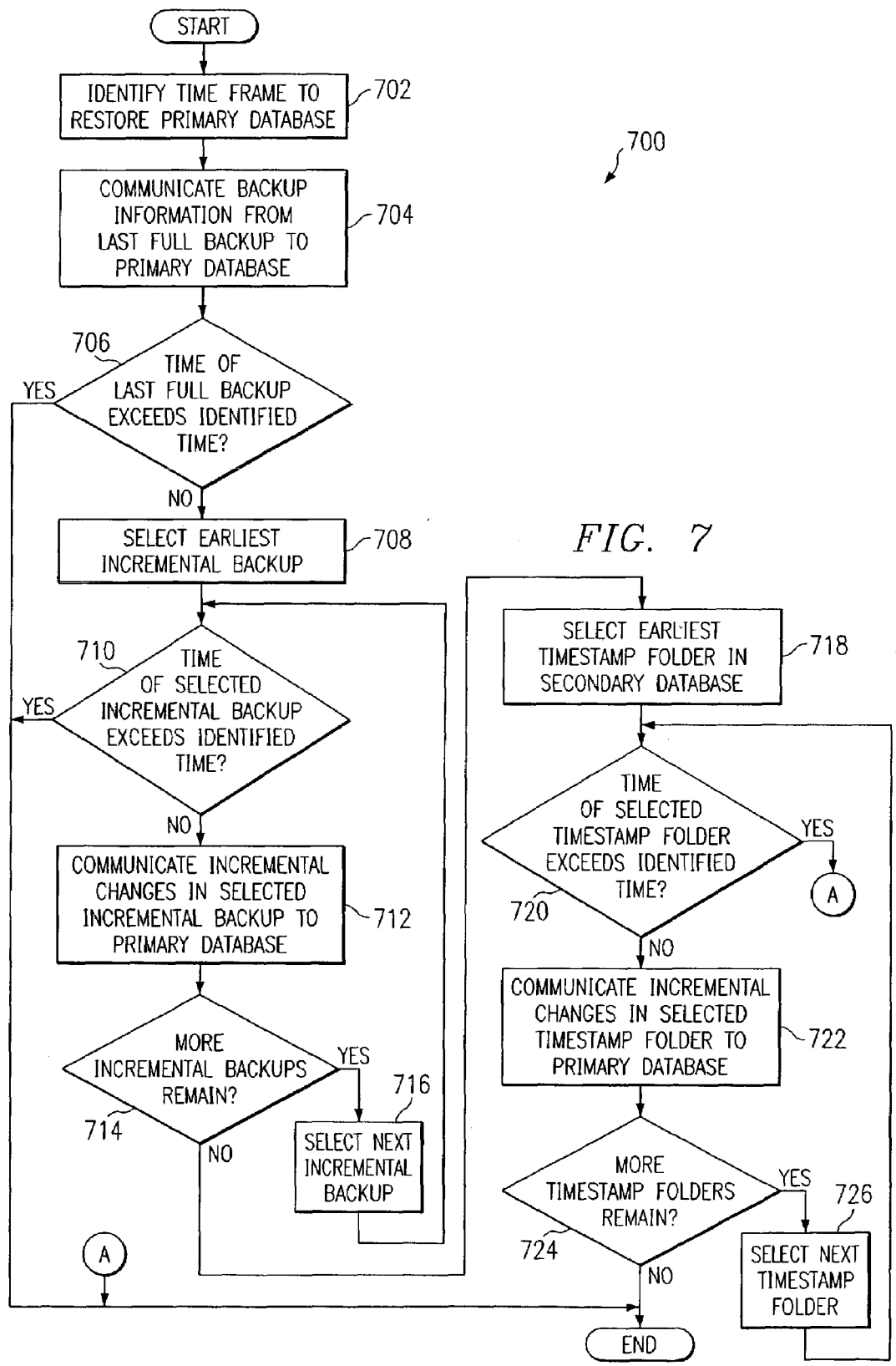
FIG. 7 is an exemplary flow diagram illustrating a method for file restoration at a secondary server according to one embodiment of the present disclosure.

FIG. 7 is an exemplary flow diagram illustrating a method 700 for file restoration at secondary server 104 according to one embodiment of the present disclosure. Method 700 may, for example, be used by secondary server 104 during the recovery phase of the disaster recovery operation. Although method 700 may be described with respect to secondary server 104 of FIG. 1, method 700 may be used by any other suitable platform or platforms without departing from the scope of the present disclosure. Also, although method 700 may be described with respect to a single primary server 102, multiple primary servers 102 may be supported by secondary server 104.

Secondary server 104 identifies a time frame at step 702. The time frame may represent a time to which primary database 110 is to be restored. The time frame may, for example, represent a time at or near the time of the failure of primary database 110, a time before the failure of database 110, and/or any other suitable time. Secondary server 104 may receive the identified time frame from a user, such as a user using client 108 or console application 310, or in any other suitable manner.

Secondary server 104 communicates backup information from the last full backup 116 to primary database 110 at step 704. This may include, for example, backup system 112 communicating the backup information from the last full backup 116 to primary server 102 over network 106.

Secondary server 104 determines whether the time that the last full backup 116 occurred exceeds the identified time at step 706. This may include, for example, secondary server 104 comparing the time that the last full backup 116 began to the identified time received at step 702. If the time associated with the last full backup 116 exceeds the identified time, method 700 ends. Secondary server 104 need take no further action to restore primary database 110.

Otherwise, secondary server 104 selects the earliest incremental backup 120 at step 708. Secondary server 104 determines whether the time associated with the selected incremental backup 120 exceeds the identified time at step 710. If so, secondary server 104 need take no further action to restore primary database 110, and method 700 ends. Otherwise, secondary server 104 communicates the incremental changes 118 contained in the selected incremental backup 120 to primary database 110 at step 712. This may include, for example, backup system 112 communicating the incremental changes 118 in the selected incremental backup 120 to primary server 102 over network 106.

Secondary server 104 determines whether more incremental backups 120 remain to be processed in backup system 112 at step 714. If additional incremental backups 120 remain, secondary server 104 selects the next incremental backup 120 at step 716. This may include, for example, secondary server 104 selecting the next incremental backup 120 that occurred sequentially after the current incremental backup 120. Secondary server 104 then returns to step 710 to determine whether the incremental changes 118 in the new selected incremental backup 120 should be communicated to primary database 110.

If no incremental backups 120 remain at step 714, secondary server 104 selects the earliest timestamp folder 256 in secondary database 114 at step 718. This may include, for example, secondary server 104 identifying the timestamp folder 256 having the earliest timestamp label. This may also include secondary server 104 identifying the earliest timestamp folder 256 in the server folder 254 associated with the primary database 110.

Secondary server 104 determines whether a time associated with the selected timestamp folder 256 exceeds the identified time at step 720. This may include, for example, secondary server 104 comparing the timestamp of the selected timestamp folder 256 to the identified time. If the identified time exceeds the time associated with the selected timestamp folder 256, method 700 ends. Otherwise, secondary server 104 communicates the incremental changes 118 contained in the selected timestamp folder 256 to primary database 110 at step 722. This may include, for example, secondary server 104 communicating the incremental changes 118 to primary server 102 over network 106.

Secondary server 104 determines whether additional timestamp folders 256 exist in secondary database 114 at step 724. If no additional timestamp folders 256 remain to be processed, method 700 ends. If additional timestamp folders 256 remain, secondary server 104 selects the next timestamp folder 256 at step 726. This may include, for example, secondary server 104 selecting the timestamp folder 256 having the next sequential timestamp. Secondary server 104 then returns to step 720 to process the new selected timestamp folder 256.

Although FIG. 7 illustrates one example of a method 700 for file restoration at secondary server 104, various changes may be made to method 700 without departing from the scope of the present disclosure. For example, secondary server 104 could be programmed to automatically restore primary database 110 to a state that existed at or near the time of failure of database 110. In this case, secondary server 104 need not receive a time frame or compare the received time to the times associated with the last full backup 116, the incremental backups 120, and the timestamp folders 256. Also, each incremental change 118 stored in backup system 112 and/or secondary database 114 could be timestamped to show the time that the incremental change 118 was made. In this embodiment, secondary server 104 could compare the timestamp associated with each incremental change 118 to the time received at step 702. In this way, secondary server 104 need not communicate all of the incremental changes 118 contained in an incremental backup 120 and/or a timestamp folder 256 to primary server 102. Further, method 700 assumes that backup system 112 and secondary database 114 are located on the same platform, such as secondary server 104. In another embodiment, backup system 112 and secondary database 114 may be located on different platforms, and each platform may perform a subset of the illustrated steps. In addition, FIG. 7 illustrates secondary server 104 determining whether information should be communicated to primary server 102 using the identified time. In another embodiment, secondary server 104 could communicate all appropriate information to primary server 102, and primary server 102 determines whether information should be communicated to primary server 102 using the identified time.

FIG. 8 is an exemplary flow diagram illustrating a method 800 for file restoration at primary server 102 according to one embodiment of the present disclosure. Method 800 may, for example, be used by primary server 102 during the recovery phase of the disaster recovery operation. Although method 800 may be described with respect to primary server 102 of FIG. 1, method 800 may be used by any other suitable platform or platforms without departing from the scope of the present disclosure.

Primary server 102 receives backup information from backup system 112 at step 802. This may include, for example, primary server 102 receiving the information stored during the last full backup 116 that occurred before the failure of primary database 110. Primary server 102 stores the backup information in primary database 110 at step 804. This may include, for example, primary server 102 storing the backup information received from backup system 112 in the appropriate folders 200–202 in primary database 110. This restores primary database 110 to a state that existed at or near the time of the last full backup 116.

Primary server 102 receives one or more incremental changes 118 from backup system 112 at step 806. The incremental changes 118 may, for example, have been stored in backup system 112 during one or more incremental backups 120. Primary server 102 recreates the incremental changes 118 to the information stored in primary database 110 at step 808. This may include, for example, primary server 102 receiving an incremental change 118 and performing the same change to the information in primary database 110. This restores primary database 110 to a state that existed at or near the time of the last incremental backup 120.

Primary server 102 receives one or more incremental changes 118 from secondary database 114 at step 810. This may include, for example, secondary server 104 communicating the incremental changes 118 from one or more timestamp folders 256 to primary server 102 over network 106. Primary server 102 recreates the incremental changes 118 received from secondary database 114 in primary database 110 at step 812. This restores primary database 110 to a state that existed at or near the time of the failure of primary database 110.

Although FIG. 8 illustrates one example of a method 800 for file restoration at primary server 102, various changes may be made to method 800 without departing from the scope of the present disclosure. For example, method 800 is illustrated as restoring primary database 110 to a state that existed at or near the time of the database failure. Primary database 110 could also be restored to a state that existed before the failure of database 110. In one embodiment, primary server 102 could restore primary database 110 using steps 802–804 without using steps 806–812. Primary server 102 could also restore primary database 110 using steps 802–808 without using steps 810–812. Other embodiments using a subset of the illustrated steps may be used without departing from the scope of the present disclosure.

While the present disclosure has been described in terms of preferred embodiments and generally associated methods, alterations and permutations of the preferred embodiments and method will be apparent to those skilled in the art. Accordingly, the above description of preferred exemplary embodiments does not define or constrain the present disclosure. Other changes, substitutions, and alterations are also possible without departing from the spirit and scope of the present disclosure, as defined by the following claims.

What is claimed is:

1. A method for disaster recovery, comprising:
   starting a replication task operable to detect an incremental change in a second database;
   accessing a taskfile to identify at least one of a first file to be monitored for incremental changes, a first folder to be monitored for incremental changes, a first registry to be monitored for incremental changes, a second file to be excluded from monitoring, a second folder to be excluded from monitoring, and a second registry to be excluded from monitoring;
   communicating at least a portion of the information from the second database for storage in a backup system as backup information after the replication task has started;
   communicating a detected incremental change from the replication task for storage in a first database, the incremental change representing a change to at least a portion of information in the second database;
   receiving at least one of backup information and the incremental change; and
   restoring the second database using at least one of the backup information and the incremental change.

2. The method of claim 1, wherein restoring the second database comprises:
   storing the backup information in the second database; and
   implementing the incremental change to at least a portion of the information in the second database.

3. The method of claim 1, wherein receiving the incremental change comprises:
   receiving a first incremental change from the backup system; and
   receiving a second incremental change from the first database.

4. The method of claim 3, wherein restoring the second database comprises:
   storing the backup information in the second database;
   implementing the first incremental change to at least a portion of the information in the second database; and
   implementing the second incremental change to at least a portion of the information in the second database after implementing the first incremental change.

5. The method of claim 3, further comprising receiving a restoration time; and
wherein restoring the second database comprises:
storing the backup information in the second database;
implementing the first incremental change to at least a portion of the information in the second database when a first time associated with the first incremental change does not exceed the restoration time; and
implementing the second incremental change to at least a portion of the information in the second database when a second time associated with the second incremental change does not exceed the restoration time.

6. The method of claim 1, wherein communicating the incremental change for storage in the first database comprises:
detecting incremental changes in at least one file system;
accumulating a plurality of incremental changes detected during each of a plurality of time windows; and
communicating the accumulated incremental changes for storage in the first database after each time window.

7. A system for disaster recovery, comprising:
at least one computer readable medium; and
logic encoded on the at least one computer readable medium and operable when executed to:
start a replication task operable to detect an incremental change in a second database;
access a taskfile to identify at least one of a first file to be monitored for incremental changes, a first folder to be monitored for incremental changes, a first registry to be monitored for incremental changes, a second file to be excluded from monitoring, a second folder to be excluded from monitoring, and a second registry to be excluded from monitoring;
communicate at least a portion of the information from the second database for storage in a backup system as backup information after the replication task has started;
communicate a detected incremental change from the replication task for storage in a first database, the incremental change representing a change to at least a portion of information in the second database;
receive at least one of backup information and the incremental change; and
restore the second database using at least one of the backup information and the incremental change.

8. The system of claim 7, wherein the logic is operable to restore the second database by:
storing the backup information in the second database; and
implementing the incremental change to at least a portion of the information in the second database.

9. The system of claim 7, wherein the logic is operable to receive the incremental change by:
receiving a first incremental change from the backup system; and
receiving a second incremental change from the first database.

10. The system of claim 9, wherein the logic is operable to restore the second database by:
storing the backup information in the second database;
implementing the first incremental change to at least a portion of the information in the second database; and
implementing the second incremental change to at least a portion of the information in the second database after implementing the first incremental change.

11. The system of claim 9, wherein:
the logic is further operable to receive a restoration time; and
the logic is operable to restore the second database by:
storing the backup information in the second database;
implementing the first incremental change to at least a portion of the information in the second database when a first time associated with the first incremental change does not exceed the restoration time; and
implementing the second incremental change to at least a portion of the information in the second database when a second time associated with the second incremental change does not exceed the restoration time.

12. A system for disaster recovery, comprising:
a first database operable to store information; and
one or more processors collectively operable to:
start a replication task operable to detect an incremental change in the first database;
access a taskfile to identify at least one of a first file to be monitored for incremental changes, a first folder to be monitored for incremental changes, a first registry to be monitored for incremental changes, a second file to be excluded from monitoring, a second folder to be excluded from monitoring, and a second registry to be excluded from monitoring;
communicate at least a portion of the information from the first database for storage in a backup system as backup information after the replication task has started;
communicate a detected incremental change from the replication task for storage in a second database, the incremental change representing a change to at least a portion of information in the first database;
receive at least one of backup information and the incremental change; and
restore the first database using at least one of the backup information and the incremental change.

13. The system of claim 12, wherein the one or more processors are collectively operable to restore the first database by:
storing the backup information in the first database; and
implementing the incremental change to at least a portion of the information in the first database.

14. The system of claim 12, wherein the one or more processors are collectively operable to receive the incremental change by:
receiving a first incremental change from the backup system; and
receiving a second incremental change from the second database.

15. The system of claim 14, wherein the one or more processors are collectively operable to restore the first database by:
storing the backup information in the first database;
implementing the first incremental change to at least a portion of the information in the first database; and
implementing the second incremental change to at least a portion of the information in the first database after implementing the first incremental change.

16. The system of claim 14, wherein:
the one or more processors are further collectively operable to receive a restoration time; and the one or more processors are collectively operable to restore the first database by:
    storing the backup information in the first database;
    implementing the first incremental change to at least a portion of the information in the first database when a first time associated with the first incremental change does not exceed the restoration time; and
    implementing the second incremental change to at least a portion of the information in the first database when a second time associated with the second incremental change does not exceed the restoration time.

17. The system of claim 12, wherein the one or more processors are further collectively operable to communicate at least a portion of the information from the first database for storage in the backup system as the backup information.

18. A system for disaster recovery, comprising:
a file system monitor operable to:
    access a taskfile to identify at least one of a first file to be monitored for incremental changes, a first folder to be monitored for incremental changes, a first registry to be monitored for incremental changes, a second file to be excluded from monitoring, a second folder to be excluded from monitoring, and a second registry to be excluded from monitoring; and
    detect a plurality of incremental changes to information in at least one first file system based, at least in part, on the taskfile;
a transaction accumulator operable to receive the plurality of incremental changes and to accumulate the plurality of incremental changes received during a determined time period; and
a service operable to execute a replication task, the replication task operable to receive the accumulated incremental changes and to communicate the accumulated incremental changes for storage in a second file system, wherein the at least one first file system may be restored using at least one of backup information and the incremental change, the backup information comprising at least a portion of the information from the at least one first file system previously stored in a backup system.

19. A system for disaster recovery, comprising:
means for starting a replication task operable to detect an incremental change in a second database;
means for accessing a taskfile to identify at least one of a first file to be monitored for incremental changes, a first folder to be monitored for incremental changes, a first registry to be monitored for incremental changes, a second file to be excluded from monitoring, a second folder to be excluded from monitoring, and a second registry to be excluded from monitoring;
means for communicating at least a portion of the information from the second database for storage in a backup system as backup information after the replication task has started;
means for communicating a detected incremental change from the replication task for storage in a first database, the incremental change representing a change to at least a portion of information in the second database;
means for receiving at least one of backup information and the incremental change; and
means for restoring the second database using at least one of the backup information and the incremental change.

20. A method for disaster recovery, comprising:
receiving an incremental change representing a change to at least a portion of information in a first database, the incremental change consisting of information associated with one of a first file monitored for incremental changes, a first folder monitored for incremental changes, or a first registry monitored for incremental changes;
storing the incremental change in a second database;
communicating the incremental change for use in restoring the first database, the first database restored using at least one of backup information and the incremental change, the backup information comprising at least a portion of the information from the first database previously stored in a backup system;
renaming the second folder from an old name to a new name before communicating at least a portion of the second folder for storage in the backup system, the new name comprising a timestamp; and
creating the first folder, the first folder having the old name of the second folder.

21. The method of claim 20, wherein the incremental change comprises a first incremental change; and
further comprising:
    receiving a second incremental change, the second incremental change consisting of information associated with one of a second file monitored for incremental changes, a second folder monitored for incremental changes, or a second registry monitored for incremental changes;
    storing the second incremental change in the second database; and
    communicating the second incremental change for storage in the backup system, the backup system operable to communicate the second incremental change for use in restoring the first database.

22. The method of claim 21, wherein:
storing the first incremental change in the second database comprises storing the first incremental change in a first folder; and
communicating the second incremental change for storage in the backup system comprises communicating at least a portion of a second folder containing the second incremental change for storage in the backup system.

23. The method of claim 20, wherein:
the incremental change is associated with a first file located in a first file system folder in the first database, the first file system folder located in a first drive folder, the first file having a file name; and
storing the incremental change in the second database comprises storing the incremental change in a second file located in a second file system folder, the second file system folder associated with the first file system folder, the second file system folder located in a second drive folder associated with the first drive folder, the second file having the file name.

24. The method of claim 23, wherein storing the incremental change in the second file comprises:
determining if the second drive system folder exists;
creating the second drive system folder if it does not exist;
determining if the second file system folder exists;
creating the second file system folder if it does not exist;
determining if the second file exists; and
creating the second file if it does not exist.

25. The method of claim 20, wherein the incremental change is stored in one of a plurality of timestamp folders, one of the timestamp folders representing a current time period, at least one of the remaining timestamp folders representing at least one previous time period.

26. The method of claim 25, further comprising receiving a restoration time; and
wherein communicating the incremental change for use in restoring the first database comprises:
determining whether a time associated with the timestamp folder in which the incremental change is stored exceeds the restoration time; and
communicating the incremental change for use in restoring the first database when the time associated with the timestamp folder does not exceed the restoration time.

27. The method of claim 20, further comprising:
receiving the backup information; and
storing the backup information in the backup system.

28. A system for disaster recovery, comprising:
at least one computer readable medium; and
logic encoded on the at least one computer readable medium and operable when executed to:
receive a first incremental change representing a change to at least a portion of information in a first database, the first incremental change consisting of information associated with one of a first file monitored for incremental changes, a first folder monitored for incremental changes, or a first registry monitored for incremental changes;
store the first incremental change in a first folder in a second database; and
communicate the incremental change for use in restoring the first database, the first database restored using at least one of backup information and the incremental change, the backup information comprising at least a portion of the information from the first database previously stored in a backup system;
receive a second incremental change, the second incremental change consisting of information associated with one of a second file monitored for incremental changes, a second folder monitored for incremental changes, or a second registry monitored for incremental changes;
store the second incremental change in a second folder in the second database;
rename the second folder from an old name to a new name before communicating at least a portion of the second folder for storage in the backup system, the new name comprising a timestamp;
create the first folder, the first folder having the old name of the second folder; and
communicate the second incremental change for storage in the backup system by communicating at least a portion of the second folder for storage in the backup system, the backup system operable to communicate the second incremental change for use in restoring the first database.

29. The system of claim 28, wherein:
the incremental change is associated with a first file located in a first file system folder in the first database, the first tile system folder located in a first drive folder, the first tile having a file name; and
the logic is operable to store the incremental change by:
determining if a second drive system folder associated with the first drive system folder exists in the second database;
creating the second drive system folder if it does not exist;
determining if a second file system folder associated with the first file system folder exists in the second database;
creating the second file system folder if it does not exist;
determining if a second file having the file name exists;
creating the second tile if it does not exist; and
storing the incremental change in the second file.

30. The system of claim 28, wherein:
the incremental change is stored in one of a plurality of timestamp folders, one of the timestamp folders representing a current time period, at least one of the remaining timestamp folders representing at least one previous time period;
the logic is further operable to receive a restoration time; and
the logic is operable to communicate the incremental change for use in restoring the first database by:
determining whether a time associated with the timestamp folder in which the incremental change is stored exceeds the restoration time; and
communicating the incremental change for use in restoring the first database when the time associated with the timestamp folder does not exceed the restoration time.

31. The system of claim 28, wherein the logic is further operable to:
receive the backup information; and
store the backup information in the backup system.

32. A system for disaster recovery, comprising:
a first database operable to store an incremental change; and
one or more processors collectively operable to:
receive the incremental change, the incremental change representing a change to at least a portion of information in a second database and consisting of information associated with one of a first file monitored for incremental changes, a first folder monitored for incremental changes, or a first registry monitored for incremental changes;
store the incremental change in the first database;
communicate the incremental change for use in restoring the second database, the second database restored using at least one of backup information and the incremental change, the backup information comprising at least a portion of the information from the second database previously stored in a backup system;
receive a second incremental change, the second incremental change consisting of information associated with one of a second file monitored for incremental changes, a second folder monitored for incremental changes, or a second registry monitored for incremental changes;
store the second incremental change in a second folder in the second database;
rename the second folder from an old name to a new name before communicating at least a portion of the second folder for storage in the backup system, the new name comprising a timestamp;
create the first folder, the first folder having the old name of the second folder; and
communicate the second incremental change for storage in the backup system by communicating at least a portion of the second folder for storage in the backup system, the backup system operable to communicate the second incremental change for use in restoring the first database.

33. The system of claim 32, wherein:
the incremental change is associated with a first file located in a first file system folder in the second database, the first file system folder located in a first drive folder, the first file having a tile name; and
the one or more processors are collectively operable to store the incremental change by:
  determining if a second drive system folder associated with the first drive system folder exists in the first database;
  creating the second drive system folder if it does not exist;
  determining if a second file system folder associated with the first file system folder exists in the first database;
  creating the second file system folder if it does not exist;
  determining if a second file having the file name exists;
  creating the second file if it does not exist; and
  storing the incremental change in the second file.

34. The system of claim 32, wherein:
the incremental change is stored in one of a plurality of timestamp folders, one of the timestamp folders representing a current time period, at least one of the remaining timestamp folders representing at least one previous time period;
the one or more processors are further collectively operable to receive a restoration time; and
the one or more processors are collectively operable to communicate the incremental change for use in restoring the second database by:
  determining whether a time associated with the timestamp folder in which the incremental change is stored exceeds the restoration time; and
  communicating the incremental change for use in restoring the second database when the time associated with the timestamp folder does not exceed the restoration time.

35. The system of claim 32, wherein the one or more processors are further collectively operable to:
receive the backup information; and
store the backup information in the backup system.

* * * * *